(12) United States Patent
Zelano et al.

(10) Patent No.: US 10,927,918 B2
(45) Date of Patent: Feb. 23, 2021

(54) DAMPING VALVE, IN PARTICULAR FOR SHOCK ABSORBERS OF VEHICLES, WITH ADJUSTABLE DAMPING FORCE

(71) Applicant: Kendrion (Villingen) GmbH, Villingen-Schwenningen (DE)

(72) Inventors: Frank Zelano, Georgen (DE); Berndt Niethammer, Köningsfeld (DE); Klaus Arndt, Lohme (DE)

(73) Assignee: Kendrion (Villingen) GmbH, Villingen-Schwenningen (DE)

( * ) Notice: Subject to any disclaimer, the term of this patent is extended or adjusted under 35 U.S.C. 154(b) by 0 days.

(21) Appl. No.: 14/377,761

(22) PCT Filed: Feb. 6, 2013

(86) PCT No.: PCT/DE2013/100042
§ 371 (c)(1),
(2) Date: Dec. 9, 2014

(87) PCT Pub. No.: WO2013/117191
PCT Pub. Date: Aug. 15, 2013

(65) Prior Publication Data
US 2015/0144445 A1 May 28, 2015

(30) Foreign Application Priority Data
Sep. 2, 2012 (DE) ...................... 10 2012 201 963.4

(51) Int. Cl.
*F16F 9/46* (2006.01)
(52) U.S. Cl.
CPC .................... *F16F 9/464* (2013.01)
(58) Field of Classification Search
CPC ............... B60G 2600/26; B60G 17/08; Y10T 137/86734; Y10T 137/86759;
(Continued)

(56) References Cited

U.S. PATENT DOCUMENTS 3,794,063 A * 2/1974 Carroll ...................... F16K 3/26
137/505.18
4,838,954 A * 6/1989 Perach ................ F16H 61/0251
137/625.17
(Continued)

FOREIGN PATENT DOCUMENTS

DE 36 11 315 A1 10/1987
DE 37 19 113 C1 8/1988
(Continued)

OTHER PUBLICATIONS

International search report for related application PCT/DE2013/100042, dated Jun. 20, 2014.
(Continued)

*Primary Examiner* — Bradley T King
*Assistant Examiner* — Stephen M Bowes
(74) *Attorney, Agent, or Firm* — William Gray Mitchell (57) ABSTRACT

The invention relates to a damping valve, in particular for shock absorbers of vehicles, with an adjustable damping force, in which differently sized outlet openings arranged between an inflow and an outflow can more or less be closed in order to obtain a desired damping effect. To this end, the differently sized outlet openings are more or less sealed off radially by means of a valve slide. In another embodiment, sudden pressure increases in the damping valve are automatically reduced by means of a differential area function. Due to said invention, said damping valve can be produced easily, has low leakage loss, a low tolerance chain and requires little effort for setting the desired damping.

14 Claims, 4 Drawing Sheets

(58) Field of Classification Search
CPC ....... F16K 31/0613; F16F 9/465; F16F 9/466; F16F 9/062; F16F 9/34
USPC .......................................... 137/625.3, 625.33
See application file for complete search history.

(56) References Cited

U.S. PATENT DOCUMENTS

| | | | | |
|---|---|---|---|---|
| 5,427,147 | A * | 6/1995 | Henriksson | F16K 47/08 137/625.3 |
| 5,464,079 | A * | 11/1995 | Lohberg | B60G 17/08 188/280 |
| 5,639,066 | A * | 6/1997 | Lambert | F02M 63/0017 251/129.07 |
| 9,145,975 | B2 * | 9/2015 | Waterstredt | F16K 31/06 |
| 2007/0017586 | A1 * | 1/2007 | Bohaychuk | E21B 34/04 137/625.33 |
| 2008/0203341 | A1 * | 8/2008 | Feigel | F16K 31/0679 251/129.1 |

FOREIGN PATENT DOCUMENTS

| | | |
|---|---|---|
| DE | 38 23 430 A1 | 1/1990 |
| DE | 40 41 619 A1 | 6/1992 |
| DE | 41 08 026 A1 | 9/1992 |
| DE | 41 37 403 A1 | 5/1993 |
| DE | 10 2006 014 463 | 8/2007 |
| DE | 10 2006 0144663 A1 | 8/2007 |
| GB | 1 021 877 A | 3/1966 |
| JP | S62-283233 A | 11/1986 |
| JP | S63-312532 C | 12/1988 |
| JP | H04-232194 B | 6/1990 |
| JP | H03-012680 | 2/1991 |
| JP | 2000-205435 | 7/2000 |
| WO | WO 2008/148 553 A2 | 12/2008 |
| WO | WO 2011087973 A2 * | 7/2011 ............. F16K 31/06 |

OTHER PUBLICATIONS

Office Action issued by Japanese Patent Office for parallel application 2014-555941 dated Nov. 22, 2016.

* cited by examiner

DAMPING VALVE, IN PARTICULAR FOR SHOCK ABSORBERS OF VEHICLES, WITH ADJUSTABLE DAMPING FORCE

CROSS REFERENCE TO RELATED APPLICATIONS

This patent application claims priority International Patent Application PCT/DE2012/100042, filed on Feb. 6, 2013 and German Patent Application 10 2012 201 963.4, filed on Feb. 9, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a damper valve, in particular for shock absorbers of vehicles, with adjustable damping force

Background of the Invention

The current state of knowledge is as follows.

Such damper valves are well known and regularly show an electromagnet, by which a valve slide is moved in order to close the outlet opening located between an inlet and an outlet to a greater or lesser extent and this way ensuring a throttle effect. When the outlet opening is open to a relatively large extent we create a comfortable chassis. If the vehicle shall be provided with a "hard" chassis, the throttling is increased, i.e. the outlet opening is closed to a greater extent. This way a sporty chassis can be achieved and better stabilization of the vehicle at high speeds.

An example for such an electromagnetically controlled damper valve is described in DE 41 08 026 A1. Here, the damper valve is embodied as a one-stage and/or two-stage slide valve, with the slide position being determined depending on the hydraulic pressure difference generated over the damper valve, the flow rate flowing through the damper valve, as well as the control current of the electromagnetic actuation. In this damper valve the fact is problematic that the valve slide, embodied in a sheath-like fashion, is coupled with an inductor which is moved together with the valve slide for a sectional closing of the outlet opening and thus for achieving the throttle effect. This leads to a very complicated design and additionally is prone to malfunction, due to the axial motion of the coil.

Furthermore, damper valves are known in which the electromagnet is arranged stationary inside the housing of the damper valve. Here, the rotor present in the electromagnet is connected to an exterior valve slide. However, in order to be supported this cylindrically designed exterior valve slide must encompass a bearing part located inside the exterior valve slide. Here, depending on the axial position of the exterior valve slide a particularly shaped outlet opening is closed more or less at its front by the exterior valve slide. In such a damper valve on the one hand the large number of components is problematic, and on the other hand the fact that any tilted position of the exterior valve slide can lead to jamming and thus malfunctioning of the damper valve. Accordingly these damper valves of prior art need to be produced with large internal play. Overall it has shown that these damper valves are characterized in high leakage loss. Additionally it is problematic that, in order to achieve a hyperbolically increasing control curve, i.e. the ratio between rotor stroke and cross-section of the opening, a very complex and thus complicated geometric shape of the outlet opening must be selected, which is also very expensive and aggravates the production of such damper valves. Overall, due to the complex components here increased expenses are necessary both for the assembly as well as the adjustment of the damper valve.

The objective of the present invention therefore comprises to provide a damper valve, in particular for shock absorbers of vehicles, such that on the one hand it can be produced more easily and is characterized in low leakage loss and a small number of components.

BRIEF SUMMARY OF THE INVENTION

In a preferred embodiment, a damper valve, in particular for shock absorbers of vehicles, with adjustable damping force, in which via an electromagnet an outlet opening, located between an inlet and an outlet, can be closed to a greater or lesser extent by a valve slide, wherein at least two outlet openings are provided, showing different sizes and each embodied as bores, and that these outlet openings can be radially sealed to a greater or lesser extent by the valve slide depending on the desired throttle effect.

The damper valve as described herein, wherein the outlet openings are circular bores.

The damper valve as described herein, wherein four outlet openings are provided, with these four outlet openings being arranged at an angle of 90° in reference to each other.

The damper valve as described herein, wherein two equally sized outlet openings are each located diametrically opposite each other.

The damper valve as described herein, wherein the differently sized outlet openings are arranged with the center of their openings at the same axial height in reference to the central axis of the damper valve.

The damper valve as described herein, wherein the differently sized outlet openings are arranged in reference to the valve slide such that the large outlet opening can only be opened by the valve slide when the small outlet valves have already been opened by the valve slide.

The damper valve as described herein, further comprising wherein a hydraulic return is provided from the outlet in the direction towards the rotor.

The damper valve as described herein, further comprising wherein a control pin is loosely inserted between the rotor and the valve slide.

The damper valve as described herein, wherein the control pin shows a diameter of less than 1 mm, preferably from 0.6 to 0.8 mm.

The damper valve as described herein, further comprising wherein a compensation bore is provided in the rotor, penetrating said rotor.

The damper valve as described herein, wherein the valve slide is embodied like a cup and shows at its bottom a compensation bore penetrating the bottom of the valve slide.

The damper valve as described herein, further comprising wherein a valve seat is provided, in which the differently sized outlet openings are arranged and in which the valve slide is guided.

The damper valve as described herein, further comprising wherein a compensation bore is arranged in the valve seat, arranged from the outlet in the direction towards the rotor.

The damper valve as described herein, wherein the valve seat shows a collar pointing away from the rotor, in which an adjustment disk is fixed, which pushes via the spring device against a facial end of the valve slide.

The damper valve as described herein, further comprising wherein a sheath is arranged between the valve seat and the valve slide, in which the different outlet openings are implemented.

The damper valve as described herein, wherein four circular outlet openings are arranged in the sheath, with two outlet openings of equal size each being located diametrically opposite each other.

The damper valve as described herein, wherein the valve slide is embodied as a hollow cylinder and provided with bores.

The damper valve as described herein, wherein the valve seat shows a channel from its outlet towards the outlet openings of the sheath which has a greater cross-section than the outlet openings.

The damper valve as described herein, wherein it is embodied as a normally closed damper valve.

The damper valve as described herein, wherein it is embodied as a normally open damper valve.

DETAILED DESCRIPTION OF THE INVENTION

The idea of the present invention essentially comprises that at least two differently sized outlet openings are provided, embodied as bores, which can be closed radially by valve slides to a greater or lesser extent, depending on the desired throttle effect. In such a damper valve very complex contours of the outlet openings are no longer necessary. Rather it is sufficient to provide circular and thus easily produced bores with differently large diameters. Here, the outlet openings may be arranged axially offset from each other, in reference to a central axis of the damper valve. By selecting the diameter of the bores most different cross-sections of the throttle can be created.

It has proven beneficial to provide four outlet openings, with these outlet openings being distributed preferably each at an angle of 90° in reference to each other. Two identically sized outlet openings each are here arranged diametrically opposite each other.

In order to generate a beneficial characteristic regarding the ratio of rotor stroke/overall open cross-section of the outlet openings it has proven beneficial to arranged all or some of the outlet openings with the center of their opening axially off-set from each other in reference to a central axis X of the damper valve.

However it may also be provided that the centers of the outlet openings are offset in reference to each other. Here, it should be observed that preferably the differently sized outlet openings are arranged in reference to the valve slide such that the large outlet opening or the large outlet openings are only opened by the valve slide when the small outlet opening or the small outlet openings have already been opened by the valve slide.

Furthermore it has proven advantageous to provide a control pin between the rotor and the valve slide by which in case of a sudden pressure increase inside the damper valve a greater flow rate is permitted, reducing the pressure and thus sudden pressure peaks, as occurring e.g. when driving over a pothole, being better absorbed. A similar effect is achieved when instead of such a control pin the valve slide is provided with a circumferential difference area, i.e. an enlarged exterior diameter, in order to generate a differential area function. This is discussed in greater detail in the description of the figures.

In one exemplary embodiment of the invention it is provided that the differently sized outlet openings are provided in a housing part of the damper valve, preferably the valve seat. However, instead thereof a sheath may be arranged about the valve slide, in which these outlet openings are inserted, with here it being necessary to observe that a sufficiently large channel is provided from the outlet openings of this sheath to the outlet chamber of the damper valve.

DETAILED DESCRIPTION OF THE FIGURES

Figure 1:
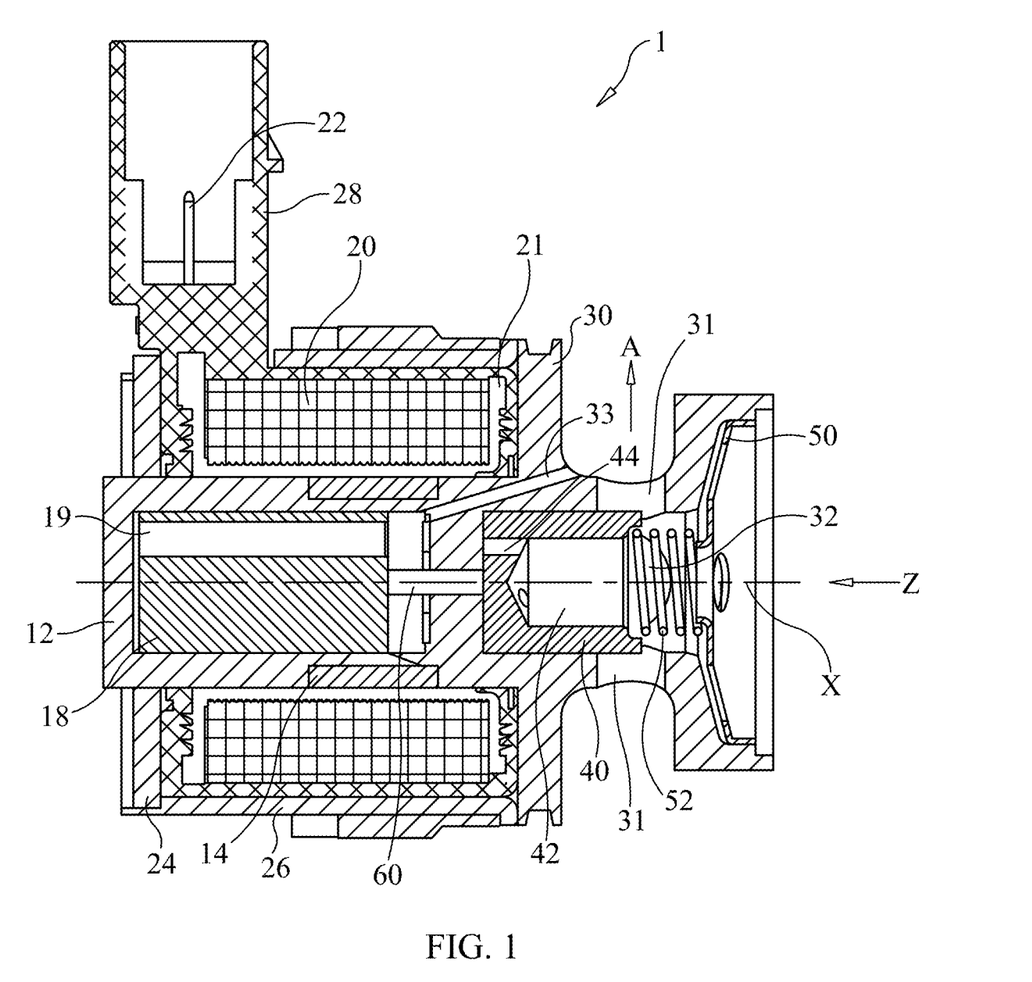
FIG. 1 is a line drawing evidencing a first exemplary embodiment of the damper valve with differently sized outlet openings, inserted in a valve seat, as well as a control pin.

FIG. 1 shows a first exemplary embodiment of a damper valve 1. The damper valve 1 shows a central axis X. Centered in reference thereto, a cup-shaped metallic pole core 12 is arranged at the left side in FIG. 1. This pole core 12 is followed by a metallic annular body 14. At the right of this annular body 14 the valve seat 30 is found, made from metal, to be explained in greater detail in the following. Inside the pole core 12 there is a rotor 18, which is provided with a compensation bore 19 penetrating the entire length of the rotor 18.

On the exterior wall of the pole core 12 and the annular body 14 as well as a part of the valve seat 30 a bobbin 21, made from plastic, is located rotationally symmetrical. This bobbin 21 carries a coil 20, which is electrically connected to a plug-in connector 22. Electricity can be supplied via this plug-in connector 22 to the coil 20 in order to axially move the rotor 18 according to the power supplied. Together with the pole core 12 and the rotor 18 the coil 20 forms an electromagnet. The entire coil 20 and the bobbin 21 are provided with a plastic coating 28, which additionally also surrounds the plug-in connector 22 like a collar.

At the left side of the damper valve 1 a metallic back-iron 24 is provided, which also acts as a left housing lid. The coil 20 and the plastic coating 28 are surrounded by a cylindrical housing wall 26. At the right of this cylindrical housing wall 26 a plate-shaped section of the valve seat 30 follows, which acts as the right housing lid.

The valve seat 30 shows a staggered penetrating bore along the central axis X. A cup-shaped valve slide 40 is located approximately in the middle of the valve seat 30. The cup-shaped opening of the valve slide 40 is marked with the reference character 42. A compensation bore 44 is located in the bottom wall of the valve slide 40, penetrating the entire bottom parallel in reference to the central axis X. For example, two or more such compensation bores 44 are inserted in the bottom of the valve slide 40. At the left of the valve slide 40 the valve seat 30 shows a penetrating bore with a relatively small diameter, in which a control pin 60 is arranged axially guided. The control pin 60, which shows e.g. a diameter of 1 mm or less, thus for example 0.6 mm to 0.8 mm, is placed centered on the central axis X and thus with its left end contacts the rotor 18 at its face and with its right end contacts the bottom of the valve slide 40 at its face.

Shown in FIG. 1, the valve seat 30 comprises an expanding annular flange at its right side, in which an adjustment disk 50 is fixed, for example by beading. A spring device 52 is supported with one end at this adjustment disk 50 and with its other end at a circumferential step of the right facial end of the valve slide 40. The damper valve 1 shows an inlet Z at the right side, which is inserted with an outlet A via several outlet openings, embodied as circular bores in the wall of the valve seat 30. In the present exemplary embodiment four such outlet openings are provided. The outlet openings are designed as circular bores, with the bores showing different sizes. The two smaller ones, which represent outlet openings located diametrically opposite each other, are marked with the reference character 31. The slightly larger outlet openings (are marked) with the reference character 32, with here the outlet opening facing the observer not being discernible due to the cross-sectional illustration of FIG. 1. Accordingly, only the outlet opening 32 appearing behind the spring device 52 in the illustration of FIG. 1 is shown here, half-way covered and facing away from the observer.

The cylindrical exterior wall of the valve slide 40 serves for the radial sealing and/or partial sealing of the above-mentioned outlet openings 31, 32 and leads this way to a throttle effect, depending to what extent the valve slide 40 is moved from the left to the right in the illustration of FIG. 1. The motion of the valve slide 40 occurs here by respective power supply of the field coil 20, causing the rotor 18 to move to the right. Here, the rotor 18 slides the control pin 60 towards the right as well, which in turn moves accordingly the valve slide 40 towards the right and this way ensures the desired throttle effect.

For reasons of completeness, it shall be mentioned that the valve seat 30 comprises a compensation bore 33, which connects the outlet A to the chamber in which the rotor is moving and ensures pressure compensation.

Figure 5:
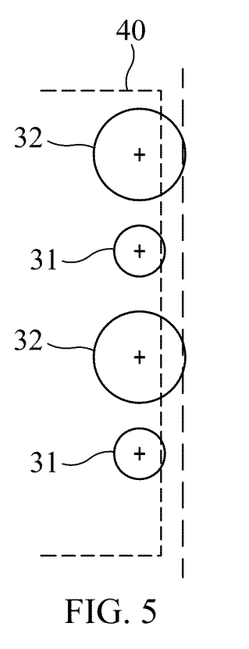
FIG. 5 is a line drawing evidencing as an example the differently sized, circular outlet openings provided, shown in a blank.

The arrangement of the differently sized four outlet openings 31, 32 is discernible in the context with FIG. 5. Here, the outlet openings 31, 32 of FIG. 1, embodied as two pairs, are shown once more graphically in a blank. The outlet opening pairs 31, 32 are located with their center axially offset in reference to the central axis X of the damper valve 1. As pictured, each outlet opening of pair 31 shows an identical first diameter, while each outlet opening of pair 32 shows an identical second diameter, and the center of each such circular opening, marked by "+", is arranged in a straight line. The valve slide 40 is also shown schematically in a blank and indicated in dot-dash lines in FIG. 5. The valve slide 40 is located in FIG. 5 precisely in the position in which it completely covers the smaller outlet opening pair 31 and thus closes them entirely. It is clearly discernible that a complete opening of the larger outlet opening pair 32 can only occur when the valve slide 40 has already released the small outlet openings completely by a motion towards the left.

Figure 4:
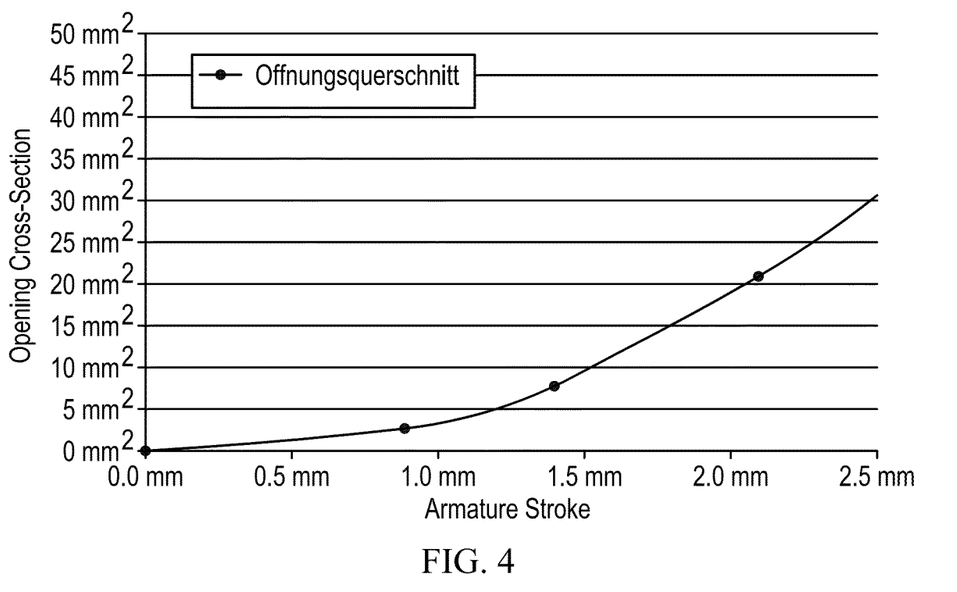
FIG. 4 is a line drawing evidencing as an example the characteristic progression of rotor stroke/open cross-section of the valves of FIG. 1 and FIG. 2.

With such an arrangement of four circular outlet openings 31, 32, which are differently sized in pairs, for example the hyperbolic control curve shown in FIG. 4 can be achieved. In the control curve shown the dependence of the cross-section of the opening is shown in reference to the rotor stroke of the rotor 18. Here, the combined open cross-section of all four outlet openings 31, 32 is called the open cross-section.

Although it was mentioned in the context with FIG. 5 that the centers of the four outlet openings 31, 32 are located on the same axial height in reference to the central axis X of the damper valve 1, this is not mandatory. The centers may also be located offset in reference to each other. Here it is only essential that a complete closing and/or opening of the smaller outlet openings 31 and the larger outlet openings 32 can only occur consecutively.

Furthermore, the scope of the invention includes that more than four outlet openings are provided or three or four differently sized outlet openings are implemented in the damper valve 1. It is essential for the invention that the outlet openings are embodied as simple, preferably circular bores.

The assembly of the damper valve 1 shown in FIG. 1 is particularly simple and occurs from the left towards the right. First the pole core 12 with the metallic annular body 14 is inserted between the coil body 21. Subsequently the rotor 18 is inserted into the pole core 12. The control pin 60 and the valve slide 40 are inserted into the valve seat 30. Subsequently the valve seat 30 equipped in this fashion is pushed in the direction towards the rotor 18. Finally the spring device 52 is placed upon the right face of the valve slide 40 and fixed via the adjustment disk 50. The axially correct positioning of the adjustment disk 50 occurs here in a particular measuring step during the assembly of the damper valve 1, in order to adjust a certain operating point of the damper valve 1. When the operating point has been set, the adjustment disk 50 is fastened at the circumferential collar of the valve seat 30, for example by beading or the like.

The operation of the damper valve 1 shown in FIG. 1 is as follows. Here it shall be observed that the entire damper valve 1 is pressure compensated. This means that the pressure applied in the inlet Z inside the valve slide 40 and, due to the bore 44 provided here in the bottom, is also applied at the left between the wall of the valve seat 30 and the bottom of the valve slide 40. The rotor 18 is also pressure compensated via the channel 33, which due to the compensation bore 19 connects the space at the right and the left of the rotor 18 and the channel 33 located in the valve seat 30.

The adjustable damper force of the damper valve 1 is achieved by axially sealing the outlet openings 31, 32 to a greater or lesser extent using the radial exterior area of the valve slide 40. In FIG. 1 the valve slide 40 is shown in its position as far left as possible. In this position the four outlet openings 31, 32 are radially sealed to a relatively small extent by the valve slide 40. When power is supplied to the coil 20 the rotor 18 moves towards the right, causing the control pin 60 to move the valve slide 40 towards the right as well in order to further close the outlet openings 31, 32.

If the vehicle shall be provided with a "hard chassis" the throttling is increased and thus the entire cross-section of the outlet openings 31, 32 is reduced. This way a sporty chassis can be yielded or better stabilization at high speeds. For a comfortable chassis and a soft damping the throttling is reduced and a larger cross-section of the outlet openings 31, 32 is adjusted, for example by the position of the valve slide 40 as far as possible to the left as shown in FIG. 1.

With the damper valve 1 of FIG. 1 it is possible, due to the control pin 60 used and the provided compensation bores 19, 44, and 33, that in case of a sudden pressure increase briefly a larger flow rate is released through the outlet openings 31, 32, resulting in the pressure reducing and sudden pressure increases being considerably better compensated, which occur for example when driving over a pothole. In case of a sudden pressure increase here the control pin 60 pushes the rotor 18 towards the left, allowing the valve slide 40 to move towards the left as well. Of course it is conditional that both the rotor 18 including the control pin 60 and the valve slide 40 are not in the initial position shown in FIG. 1 but are overall located slightly towards the right by power being applied to the coil 20.

Figure 2:
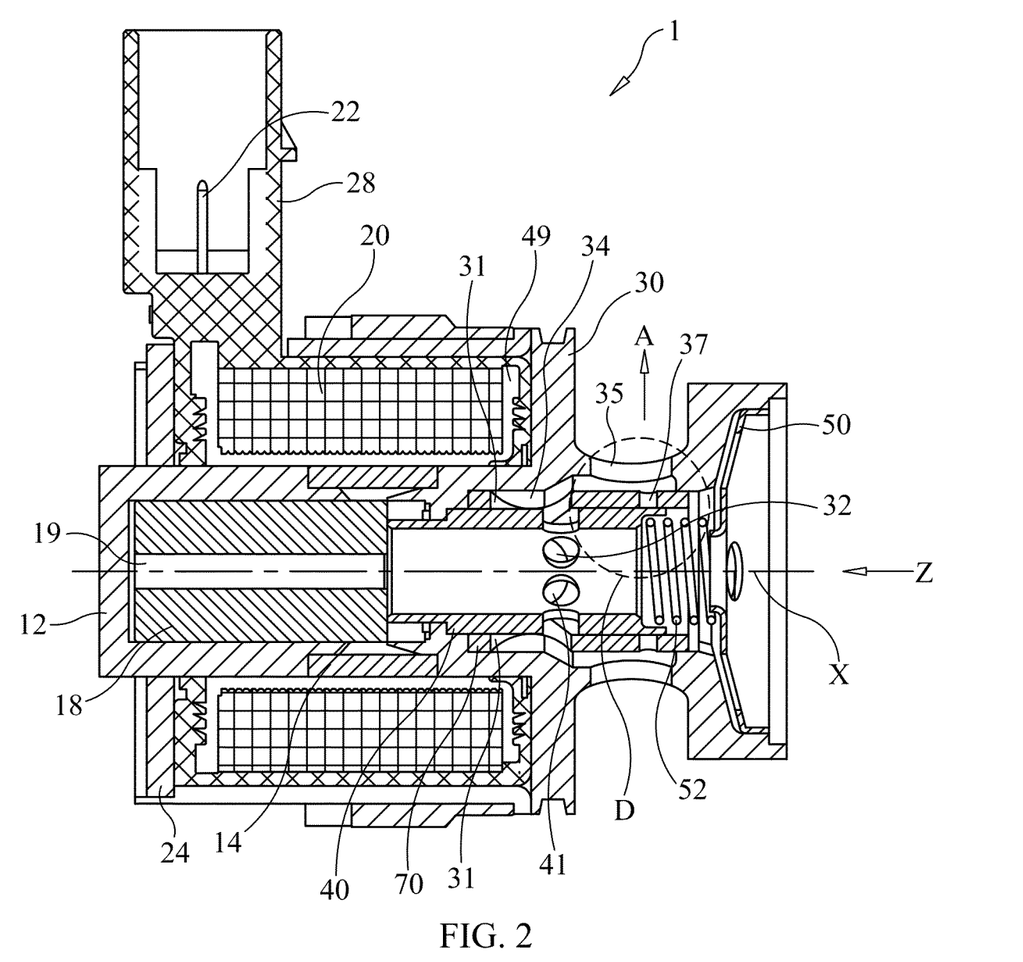
FIG. 2 is a line drawing evidencing a second exemplary embodiment of a damper valve according to the invention with a sheath arranged about the valve slide, in which differently sized outlet openings are inserted, as well as showing a differential area provided with a valve slide.

FIG. 2 shows a second exemplary embodiment of a damper valve. The already known reference characters are used again for the same parts. The electromagnetic system comprising the coil 20, the pole core 12, the metallic annual body 14, and the plastic coating 28 including the plug connector 22 is equivalent to the one of FIG. 1, as well as the adjustment disk 50 and the corresponding spring device 52.

The damper valve 1 differs in the following areas from the damper valve of FIG. 1. The compensation bore 19 is now located centered in reference to the central axis X and is therefore located in the central axis of the rotor 18. As clearly discernible in FIG. 2, here the control pin discussed in FIG. 1 is missing. Rather, now a tubular designed valve slide 40 directly abuts the face of the rotor 18 shown at the right in FIG. 2. As already known from FIG. 1, the spring device 52, embodied as a flat spring, is supported with one end at the right side of the valve slide 40 and with its other end at the adjustment disk 50. The valve slide 40 shows a plurality of preferably circular bores 41, so that the pressure medium can flow from the inlet Z into the valve slide 40 and discharge via the above-mentioned bores out of the valve slide at the outlet A. The circumferential wall of the valve slide 40 serves again for the radial sealing of outlet openings 31, 32, which are here not implemented directly in the valve seat 30 but in a tubular sheath 70, located coaxial on the valve slide 40, preferably made from metal.

Here, too, preferably four outlet openings 31, 32 are inserted in this sheath 70. The outlet openings 31, 32 are located at an angle of 90° in reference to each other. In FIG. 2 the two larger outlet openings 31 are discernible in a cross-section, located diametrically opposite each other, while one of the two smaller outlet openings 32, also located diametrically opposite each other, is discernible only partially through the bores 41 of the valve slide 40 and carries the reference character 32. It is discernible that the right edge of the two larger outlet openings 31, in FIG. 2 at the right, is located in reference to the central axis X of the damper valve 1 slightly further to the right than the right edge of the smaller outlet opening 31. A channel 34 is inserted into the valve seat 30, starting at these outlet openings, which leads to the bores 35 of the outlet A of the damper valve 1. The channel 34 and the bores 35 are here sized such that they show a greater combined diameter than the outlet openings 31, 32.

FIG. 2 shows the damper valve in the initial position of the stroke. The outlet openings 31, 32 are partially covered by the circumferential exterior wall of the valve slide 40. When power is supplied to the coil 20 the rotor moves towards the right and thus pushes the valve slide 40 towards the right as well so that the outlet openings 31, 32 are further closed and the desired throttle effect occurs.

Figure 3:
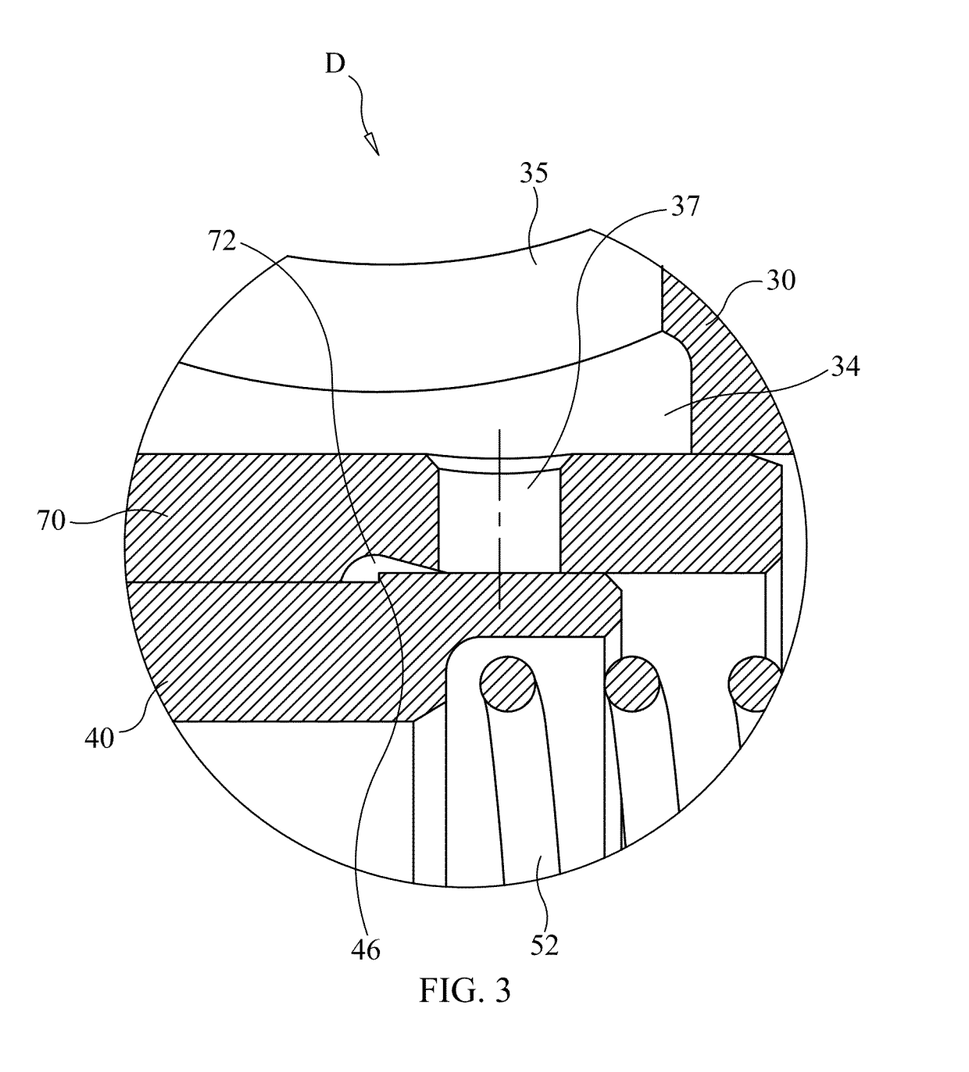
FIG. 3 is a line drawing evidencing the magnified detail D shown circular in FIG. 2 in an area of the differential area.

The differential area function realized in FIG. 1 via the control pin 60 is achieved in the exemplary embodiment of FIG. 2 via a staggered exterior contour of the valve slide 40. This detail is marked D in FIG. 2 and shown enlarged in FIG. 3. The valve slide 40 shows an annularly extending projection 46 at its end facing the spring device 52, which is surrounded by a circumferential recess 72, showing a sickle-like shape in its cross-section, inserted in the sheath 70. Additionally, a compensation bore 37 is implemented in the sheath 70, extending radially in reference to the central axis X. As shown in FIG. 2, several such compensation bores 37 may be provided. FIG. 2 shows two such compensation bores 37 in the sheath 70 in the cross-sectional illustration. The compensation bore 37 is connected to the channel 34 and thus also to the bore 35 leading to the outlet A of the valve seat 30. At the end shown in FIG. 3 at the bottom this compensation bore 37 transfers into the sickle-shaped recess 72. This way, the same pressure as in the outlet A is applied to both the compensation bore 37 as well as the sickle-shaped recess 72.

If for example the damper valve 1 in FIG. 2 is adjusted to a "hard" chassis, the valve slide 40, due to the appropriate field coil 20 and the axial motion of the rotor 18 connected thereto, moves to the right to a position in which the outlet openings 31, 32 of the sheath 70 are closed to a greater extent than in the position shown in FIG. 2. In case of a sudden pressure increase in the inlet Z, as possible when driving over a pothole, the differential area of the valve slide 40 formed by the annular projection 46 can briefly push the rotor 18 by the force applied here towards the left so that a greater flow-rate is released in the outlet openings 31, 32. This way the pressure can be reduced so that the impact upon the chassis is considerably better compensated.

The arrangement in FIG. 2 is advantageous in that the entire damper valve 1 can be constructed with a shorter axial length than the arrangement of FIG. 1.

LIST OF REFERENCE CHARACTERS

1 Damper valve
12 Pole core
14 Annular body
18 Rotor
19 Compensation bore
20 Coil
21 Coil support
22 Plug-in connector
24 Back-iron
26 Cylindrical housing wall
28 Plastic coating
30 Valve seat
31 First outlet opening
32 Second outlet opening
33 Compensation bore
34 Channel
35 Bore
37 Compensation bore
40 Valve slide
41 Bore
42 Recess 44 Bore
46 Projection
50 Adjustment disk
52 Spring device
60 Control pin
70 Sheath
72 Central axis
A Outlet
B Detail
D Detail
X Central axis
Z Inlet The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A damper valve for shock absorbers of vehicles, with adjustable damping force, in which, via an electromagnet, one or two first outlet openings, each of a first size, located between an inlet and an outlet and formed in a sheath, can be closed to a greater or lesser extent by a valve slide, wherein two second outlet openings, each of a second size, are provided, wherein the one or two first outlet openings each comprise a size different from the size of the two second outlet openings, and with each outlet opening embodied as a bore, such outlet openings can be radially sealed to a greater or lesser extent by the valve slide depending on the desired throttle effect and wherein the sheath comprising the two first outlet openings is arranged between a valve seat and the valve slide, such sheath comprising a circumferential recess abutting the valve slide such that the circumferential recess overlays an annularly extending projection emanating from the valve slide and wherein the differently sized outlet openings are arranged with the center of their openings at the same axial height in reference to the central axis of the damper valve.

2. The damper valve of claim 1, wherein the outlet openings are circular bores.

3. The damper valve of claim 1, further comprising wherein a control pin is inserted between the rotor and the valve slide.

4. The damper valve of claim 3, wherein the control pin has a diameter of less than 1 mm.

5. The damper valve of claim 1, further comprising wherein a compensation bore is provided in a rotor, penetrating said rotor.

6. The damper valve of claim 1, wherein the valve slide is embodied as a cup and has at its bottom a compensation bore penetrating the bottom of the valve slide.

7. The damper valve of claim 1, further comprising wherein the valve seat is provided, in which the differently sized outlet openings are arranged and in which the valve slide is guided.

8. The damper valve of claim 7, wherein the valve seat has a collar pointing away from the rotor, in which an adjustment disk is located, which pushes via a spring device against an end of the valve slide.

9. The damper valve of claim 1, wherein the valve seat comprises a channel from its outlet towards the outlet openings of the sheath which has a greater cross-section than the outlet openings.

10. The damper valve of claim 1, wherein the damper valve is embodied as a normally closed damper valve.

11. The damper valve of claim 1, wherein the damper valve is embodied as a normally open damper valve.

12. A damper valve for shock absorbers of vehicles, with adjustable damping force, in which, via an electromagnet, two first outlet openings, each of a first size, located between an inlet and an outlet and formed in a sheath, can be closed to a greater or lesser extent by a valve slide, wherein two second outlet openings, each of a second size, are provided, wherein the two first outlet openings each comprise a size different from the size of the two second outlet openings, and with each outlet opening embodied as a bore, such outlet openings can be radially sealed to a greater or lesser extent by the valve slide depending on the desired throttle effect and wherein the sheath comprising the two first outlet openings is arranged between a valve seat and the valve slide, such sheath comprising a circumferential recess abutting the valve slide such that the circumferential recess overlays an annularly extending projection emanating from the valve slide, wherein the first two outlet openings are equally sized and each located diametrically opposite each other.

13. A damper valve for shock absorbers of vehicles, with adjustable damping force, in which, via an electromagnet, one or two first outlet openings, each of a first size, located between an inlet and an outlet and formed in a sheath, can be closed to a greater or lesser extent by a valve slide, wherein two second outlet openings, each of a second size, are provided, wherein the one or two first outlet openings each comprise a size different from the size of the two second outlet openings, and with each outlet opening embodied as a bore, such outlet openings can be radially sealed to a greater or lesser extent by the valve slide depending on the desired throttle effect and wherein the sheath comprising the two first outlet openings is arranged between a valve seat and the valve slide, such sheath comprising a circumferential recess abutting the valve slide such that the circumferential recess overlays an annularly extending projection emanating from the valve slide, wherein the one or two first outlet openings and the second two outlet openings are arranged in the sheath, with two outlet openings of equal size each being located diametrically opposite each other.

14. A damper valve for shock absorbers of vehicles, with adjustable damping force, in which, via an electromagnet, one or two first outlet openings, each of a first size, located between an inlet and an outlet and formed in a sheath, can be closed to a greater or lesser extent by a valve slide, wherein two second outlet openings, each of a second size, are provided, wherein the one or two first outlet openings each comprise a size different from the size of the two second outlet openings, and with each outlet opening embodied as a bore, such outlet openings can be radially sealed to a greater or lesser extent by the valve slide depending on the desired throttle effect and wherein the sheath comprising the two first outlet openings is arranged between a valve seat and the valve slide, such sheath comprising a circumferential recess abutting the valve slide such that the circumferential recess overlays an annularly extending projection emanating from the valve slide, wherein the valve slide is embodied as a hollow cylinder and provided with bores.

\* \* \* \* \*

UNITED STATES PATENT AND TRADEMARK OFFICE
CERTIFICATE OF CORRECTION

Page 1 of 1

PATENT NO. : 10,927,918 B2
APPLICATION NO. : 14/377761
DATED : February 23, 2021
INVENTOR(S) : Frank Zelano, Berndt Niethammer and Klaus Arndt It is certified that error appears in the above-identified patent and that said Letters Patent is hereby corrected as shown below:

On the Title Page

On item (30) "Foreign Application Priority Data", the foreign priority filing date is incorrectly indicated as Sep. 2, 2012. The correct filing date of the foreign priority application is February 9, 2012.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*